(12) United States Patent
Xu

(10) Patent No.: US 10,191,332 B2
(45) Date of Patent: Jan. 29, 2019

(54) LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventor: Liang Xu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 125 days.

(21) Appl. No.: 15/317,125

(22) PCT Filed: Apr. 8, 2016

(86) PCT No.: PCT/CN2016/078762
§ 371 (c)(1),
(2) Date: Dec. 8, 2016

(87) PCT Pub. No.: WO2017/156809
PCT Pub. Date: Sep. 21, 2017

(65) Prior Publication Data
US 2018/0149891 A1    May 31, 2018

(30) Foreign Application Priority Data
Mar. 17, 2016   (CN) .......................... 2016 1 0158959

(51) Int. Cl.
*G02F 1/1339*    (2006.01)
*G02F 1/1335*    (2006.01)

(52) U.S. Cl.
CPC ...... *G02F 1/1339* (2013.01); *G02F 1/133602* (2013.01)

(58) Field of Classification Search
CPC .............................. G02F 1/1339; G02F 1/1335
See application file for complete search history.

(56) References Cited

U.S. PATENT DOCUMENTS

| 2009/0256998 A1 | 10/2009 | Zhao | |
| 2014/0092340 A1* | 4/2014 | Jeong | G02B 6/0035 349/60 |

FOREIGN PATENT DOCUMENTS

| CN | 201174014 Y | 12/2008 |
| CN | 101349832 A | 1/2009 |
| CN | 103712130 A | 4/2014 |
| CN | 103792716 A | 5/2014 |
| CN | 104375291 A | 2/2015 |
| CN | 105278175 A | 1/2016 |

* cited by examiner

*Primary Examiner* — Phu Vu
(74) *Attorney, Agent, or Firm* — Soroker Agmon Nordman

(57) ABSTRACT

The present disclosure provides a liquid crystal display (LCD), where the LCD includes a backlight unit, an LCD panel, a frame glue sealant used to connect to the backlight unit and the LCD panel, and at least one gasket. At least one gasket is arranged on a side of the LCD panel toward the backlight unit or the at least one gasket is arranged on a side of the backlight unit toward the LCD panel. The at least one gasket maintains separation between the LCD panel and the backlight unit. The present disclosure uses arrangement of the gaskets to be between the backlight unit and the LCD panel, which controls the separation between the backlight unit and the LCD panel, thus further making it difficult to generate mura and improving display.

8 Claims, 1 Drawing Sheet

LIQUID CRYSTAL DISPLAY

BACKGROUND OF THE INVENTION

1. Field of the Invention

The present disclosure relates to the field of displays, and more particularly to a liquid crystal display (LCD).

2. Description of the Prior Art

A liquid crystal display (LCD) panel of an LCD is connected to a backlight unit of the LCD by frame glue sealant. When the LCD panel and the backlight unit bend, this causes a large internal compressive stress of the LCD panel, which makes a distance between the LCD panel and the backlight unit of the assembled LCD become unstable. Namely, when the internal compressive stress is great, the LCD panel is correspondingly closer to the backlight unit, and when the internal compressive stress is less, the LCD panel is correspondingly farther from the backlight unit, which easily generates mura.

Therefore, the above issue of the prior art needs to improve and be solved.

SUMMARY OF THE INVENTION

The aim of the present disclosure is to provide a liquid crystal display (LCD) to solve the problem that mura is generated because an LCD generates bend and an LCD panel is contact with a backlight unit.

In order to achieve the aim of the present disclosure, the present disclosure provides the LCD.

The LCD comprises a backlight unit, an LCD panel, a frame glue sealant used to connect to the backlight unit and the LCD panel, and at least one gasket. The at least one gasket is arranged on a side of the LCD panel toward the backlight unit or the at least one gasket is arranged on a side of the backlight unit toward the LCD panel. The at least one gasket maintains a separation between the LCD panel and the backlight unit.

In the LCD of the present disclosure, there are a plurality of gaskets, and a plurality of the gaskets are uniformally and spacedly arranged.

In the LCD of the present disclosure, the at least one gasket is a photoresist block formed the side of the LCD panel toward the backlight unit using a photolithography process.

In the LCD of the present disclosure, the at least one gasket is a printing dot printed on the side of the LCD panel toward the backlight unit.

In the LCD of the present disclosure, the at least one gasket is a circular truncated cone structure. A cross-section of a first side of the at least one gasket toward the LCD panel is less than a cross-section of a second side of the at least one gasket toward the backlight unit.

In the LCD of the present disclosure, the at least one gasket is an electrostrictive gasket.

In the LCD of the present disclosure, a first driving electrode corresponding to each gasket is arranged on the side of the LCD panel, and a second driving electrode corresponding to the each gasket is arranged on the backlight unit. Each gasket is connected to the LCD panel by the corresponding first driving electrode. Each gasket is connected to the backlight unit by the corresponding second driving electrode; the first driving electrode corresponds to the second driving electrode one by one.

In the LCD of the present disclosure, height of each gasket is adjusted by voltage between the first driving electrode and the second driving electrode.

In the LCD of the present disclosure, the first driving electrode and the second driving electrode are both transparent electrodes.

In the LCD of the present disclosure, the backlight unit comprises a plastic frame, and an optical film arranged in the plastic frame; the LCD panel comprises an array substrate, a color film substrate, and a liquid crystal layer between the array substrate and a color film substrate. A first side of the at least one gasket is connected to the array substrate and a second side of the at least one gasket is connected to the optical film.

Compared with the LCD of the prior art, the present disclosure uses arrangement of the gaskets to be between the backlight unit and the LCD panel, which controls the separation between the backlight unit and the LCD panel, thus further making difficult to generate mura and improve display.

DETAILED DESCRIPTION OF THE PREFERRED EMBODIMENTS

Figure 1:
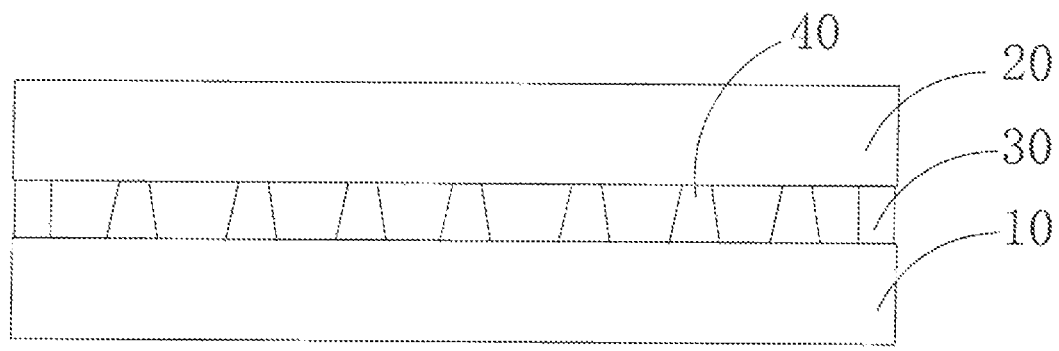
FIG. 1 is a structural diagram of a liquid crystal display (LCD) of a first embodiment of the present disclosure.

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention.

In the drawings, the components having similar structures are denoted by the same numerals.

As shown in FIG. 1, FIG. 1 is a structural diagram of a liquid crystal display (LCD) of a first embodiment of the present disclosure. The LCD comprises a backlight unit 10, an LCD panel 20, a frame glue sealant 30, and at least one gasket 40, where the frame glue sealant 30 is used to connect the backlight unit 10 and the LCD panel 20, and the at least one gasket 40 is arranged on a side of the LCD panel 20 toward the backlight unit 10, or the at least one gasket 40 is arranged on a side of the backlight unit 10 toward the LCD panel 20. In the first embodiment of the present disclosure, the at least one gasket 40 is arranged on the side of the LCD panel 20 toward the backlight unit 10. The at least one gasket 40 is used to maintain a separation between the LCD panel 20 and the backlight unit 10.

Specifically, the backlight unit 10 comprises a plastic frame, a backlight plate, a reflector plate, a light source, a light guide plate, and an optical film, where the backlight plate, the reflector plate, the light source, the light guide plate, and the optical film are arranged in the plastic frame. The backlight plate is arranged on a bottom of the plastic frame, the reflector plate is arranged on the backlight plate, the light guide plate is arranged on the reflector plate, and the optical film is arranged on the light guide plate.

The LCD panel 20 comprises an array substrate, a color film substrate, and a liquid crystal layer between the array substrate and the color film substrate.

A first side of each gasket 40 is fixed on an outside of the array substrate of the LCD panel 20. A second side of each gasket 40 is connected to the optical film of the backlight unit 10. The second side of each gasket 40 is in contact with the optical film of the backlight unit 10, or a gap is between the second side of each gasket 40 and the optical film of the backlight unit 10.

In the first embodiment of the present disclosure, there are a plurality of the gaskets 40, and the plurality of the gaskets 40 are uniformly and spacedly arranged on the LCD panel. The gaskets 40 are photoresist blocks formed on the outside of the array substrate of the LCD panel 20 toward the backlight unit 10 using a photolithography process, or the gaskets 40 are printing dots printed on the outside of the array substrate of the LCD panel 20 toward the backlight unit 10.

Furthermore, the gaskets 40 are circular truncated cone structures, where a cross-section of the first side of the gaskets 40 toward the LCD panel 20 is less than a cross-section of the second side of the gaskets 40 toward the backlight unit 10.

The LCD of the first embodiment of the present disclosure uses arrangement of the gaskets to be between the backlight unit and the LCD panel, which controls the separation between the backlight unit and the LCD panel, thus further making it difficult to generate mura.

Figure 2:
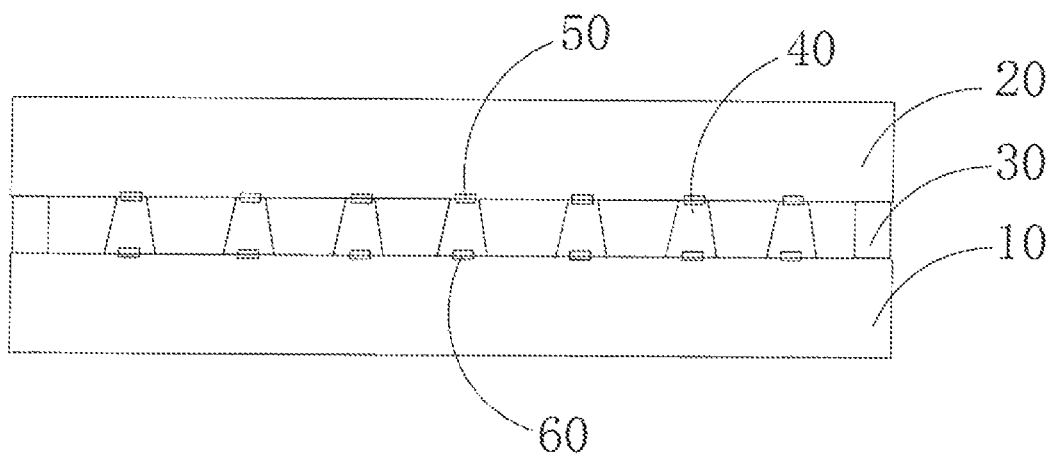
FIG. 2 is a structural diagram of the LCD of a second embodiment of the present disclosure.

As shown in FIG. 2, FIG. 2 is a structural diagram of the LCD of a second embodiment of the present disclosure. The LCD comprises the backlight unit 10, the LCD panel 20, the frame glue sealant 30, and at least one gasket 40, where the frame glue sealant 30 is used to connect the backlight unit 10 and the LCD panel 20, and the at least one gasket 40 is arranged on the side of the LCD panel 20 toward the backlight unit 10 or is arranged on the side of the backlight unit 10 toward the LCD panel 20. In the second embodiment of the present disclosure, the at least one gasket 40 is arranged on the side of the LCD panel 20 toward the backlight unit 10. The at least one gasket is used to maintain separation between the LCD panel 20 and the backlight unit 10.

Specifically, the backlight unit 10 comprises the plastic frame, the backlight plate, the reflector plate, the light source, the light guide plate, and the optical film, where the backlight plate, the reflector plate, the light source, the light guide plate, and the optical film are arranged in the plastic frame. The backlight plate is arranged on the bottom of the plastic frame, the reflector plate is arranged on the backlight plate, the light guide plate is arranged on the reflector plate, and the optical film is arranged on the light guide plate.

The LCD panel 20 comprises the array substrate, the color film substrate, and the liquid crystal layer between the array substrate and the color film substrate.

In the second embodiment of the present disclosure, the at least one gasket 40 is an electrostrictive gasket, and the at least one gasket 40 is made of ferroelectric polymer material. A first driving electrode 50 corresponding to each gasket 40 is arranged on the outside of the array substrate of the LCD panel 20 toward the backlight unit 10, and a second driving electrode 60 corresponding to the each gasket 40 is arranged on the backlight unit 10. Each gasket 40 is connected to the array substrate of the LCD panel 20 by the first driving electrode 50. Each gasket 40 is connected to the optical film of the backlight unit 10 by the second driving electrode 60, where the first driving electrode 50 corresponds to the second driving electrode 60 one by one. Height of each gasket 40 is adjusted by voltage between the first driving electrode 50 and the second driving electrode 60.

The first driving electrode 50 and the second driving electrode 60 are both transparent electrodes.

The LCD of the second embodiment of the present disclosure uses arrangement of the gaskets to be between the backlight unit and the LCD panel and the gasket 40 is an electrostrictive gasket, which controls the separation between the backlight unit and the LCD panel, thus further making it difficult to generate mura.

It should be understood that the present disclosure has been described with reference to certain preferred and alternative embodiments which are intended to be exemplary only and do not limit the full scope of the present disclosure as set fourth in the appended claims.

What is claimed is:
1. A liquid crystal display (LCD), comprising
a backlight unit;
an LCD panel;
a frame glue sealant used to connect to the backlight unit and the LCD panel; and
at least one gasket;
wherein the at least one gasket is arranged on a side of the LCD panel toward the backlight unit or the at least one gasket is arranged on a side of the backlight unit toward the LCD panel; and
wherein the at least one gasket maintains a separation between the LCD panel and the backlight unit; wherein the at least one gasket is an electrostrictive gasket;
wherein a first driving electrode corresponding to each gasket is arranged on the side of the LCD panel, and a second driving electrode corresponding to each gasket is arranged on the backlight unit; each gasket is connected to the LCD panel by the corresponding first driving electrode; each gasket is connected to the backlight unit by the corresponding second driving electrode; the first driving electrode corresponds to the second driving electrode one by one.

2. The LCD as claimed in claim 1, wherein there are a plurality of gaskets, and the plurality of the gaskets are uniformly and spacedly arranged.

3. The LCD as claimed in claim 1, wherein the at least one gasket is a photoresist block formed on a side of the LCD panel toward the backlight unit using a photolithography process.

4. The LCD as claimed in claim 1, wherein the at least one gasket is a priming dot printed on the side of the LCD panel toward the backlight unit.

5. The LCD as claimed in claim 1, wherein the at least one gasket is a circular truncated cone structure, and a cross-section of a first side of the at least one gasket toward the LCD panel is less than a cross-section of a second side of the at least one gasket toward the backlight unit.

6. The LCD as claimed in claim 1, wherein height of each gasket is adjusted by voltage between the first driving electrode and the second driving electrode.

7. The LCD as claimed in claim 6, wherein the first driving electrode and the second driving electrode are both transparent electrodes.

8. The LCD as claimed in claim 1, wherein the backlight unit comprises a plastic frame, and an optical film arranged in the plastic frame; the LCD panel comprises an array substrate, a color film substrate, and a liquid crystal layer between the array substrate and a color film substrate; a first side of the at least one gasket is connected to the array substrate and a second side of the at least one gasket is connected to the optical film.

\* \* \* \* \*